(12) United States Patent
Chandrashekaraiah (10) Patent No.: US 12,019,539 B2
(45) Date of Patent: Jun. 25, 2024

(54) ADAPTIVE CONFIGURATION OF MEMORY DEVICES USING HOST PROFILING

(71) Applicant: Micron Technology, Inc., Boise, ID (US)

(72) Inventor: Manjunath Chandrashekaraiah, Folsom, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 32 days.

(21) Appl. No.: 17/856,433

(22) Filed: Jul. 1, 2022

(65) Prior Publication Data

US 2024/0004788 A1 Jan. 4, 2024

(51) Int. Cl.
*G06F 12/02* (2006.01)
*G06F 3/06* (2006.01)

(52) U.S. Cl.
CPC ........ *G06F 12/0238* (2013.01); *G06F 3/0604* (2013.01); *G06F 3/0659* (2013.01); *G06F 3/0679* (2013.01); *G06F 2212/1044* (2013.01); *G06F 2212/261* (2013.01)

(58) Field of Classification Search
CPC ............. G06F 12/02; G06F 2212/1044; G06F 2212/261; G06F 12/0238; G06F 3/06; G06F 3/0659; G06F 3/0679
See application file for complete search history.

(56) References Cited

U.S. PATENT DOCUMENTS 9,779,015 B1 * 10/2017 Oikarinen ............... G06F 12/02
10,902,139 B2 * 1/2021 Le Buhan ............... G06F 21/16
11,093,170 B2 * 8/2021 Fomin ..................... G06F 3/061
2010/0262721 A1 * 10/2010 Asnaashari ........... G06F 3/0659
 710/22
2011/0320649 A1 * 12/2011 Leventhal ............. G06F 3/0676
 710/39
2022/0019379 A1 * 1/2022 Bert ....................... G06F 3/0659
2022/0300382 A1 * 9/2022 Imamura ............. G06F 12/0862

OTHER PUBLICATIONS

M. LeBeane et al., "Extended Task Queuing: Active Messages for Heterogeneous Systems," SC '16: Proceedings of the International Conference for High Performance Computing, Networking, Storage and Analysis, Salt Lake City, UT, USA, 2016, pp. 933-944.*
M. Zadnik, J. Korenek, P. Kobiersky and O. Lengal, "Network Probe for Flexible Flow Monitoring," 2008 11th IEEE Workshop on Design and Diagnostics of Electronic Circuits and Systems, Bratislava, Slovakia, 2008, pp. 1-6.*

* cited by examiner

*Primary Examiner* — Pierre Michel Bataille
(74) *Attorney, Agent, or Firm* — NICHOLSON DE VOS WEBSTER & ELLIOTT LLP (57) ABSTRACT

Exemplary methods, apparatuses, and systems including an adaptive configuration manager for controlling configurations of memory devices. The adaptive configuration manager receives a plurality of payloads from a host. The adaptive configuration manager identifies a profile of the host from a plurality of pre-determined host profiles. The adaptive configuration manager identifies a distribution of the plurality of memory access requests, the distribution including a set of sequential payloads and a set of random payloads. The adaptive configuration manager generates a memory access command using the profile of the host including a distribution of random and sequential access. The adaptive configuration manager executes the memory access command using the profile and a payload of the plurality of payloads.

20 Claims, 4 Drawing Sheets

ADAPTIVE CONFIGURATION OF MEMORY DEVICES USING HOST PROFILING

TECHNICAL FIELD

The present disclosure generally relates to adaptive configuration of memory devices, and more specifically, relates to using host profiling to adaptively configure a memory device.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to adaptive configuration of memory access in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Unlike some traditional enterprise applications for memory subsystems, such as solid-state drives (SSDs), meeting heterogenous demands from hosts such as in autonomous or assistive automotive technology systems is complex due to different distributions of memory access. Each host may use a different distribution of sequential and random memory access. Over the lifetime of a memory subsystem, inefficient storage of data can result in a reduction in performance. In typical systems, memory subsystems perform writes of data from a host based on the type of data that is received. For example, a memory subsystem might write some data using random-access across several memory locations and might write sequential data in between the locations where random-access data is written. Because each host can have variable sized data payloads, the memory subsystem may not efficiently allocate memory. As a result, the memory subsystem may have many unused memory locations in between written data, which leads to increased relocation of written data to organize the data storage of the memory subsystem and additional possibility for errors.

Aspects of the present disclosure address the above and other deficiencies by identifying a distribution of payloads and configuring memory access commands based on a host profile associated with the distribution. The adaptive configuration manager identifies a profile of the host that represents a distribution of sequential and random access. The adaptive configuration manager controls memory access commands using the profile to optimize writing data to memory blocks in an efficient manner. For instance, for a host that has a profile of 100% sequential, the adaptive configuration manager performs memory access commands in a region of memory blocks allocated to the host for writing sequential data. In another example, the host may have a profile of 100% random and the adaptive configuration manager performs memory access commands in a region of memory blocks for writing to random locations across the region of memory blocks. Additional details of the adaptive configuration manager are now described with regard to the figures.

Figure 1:
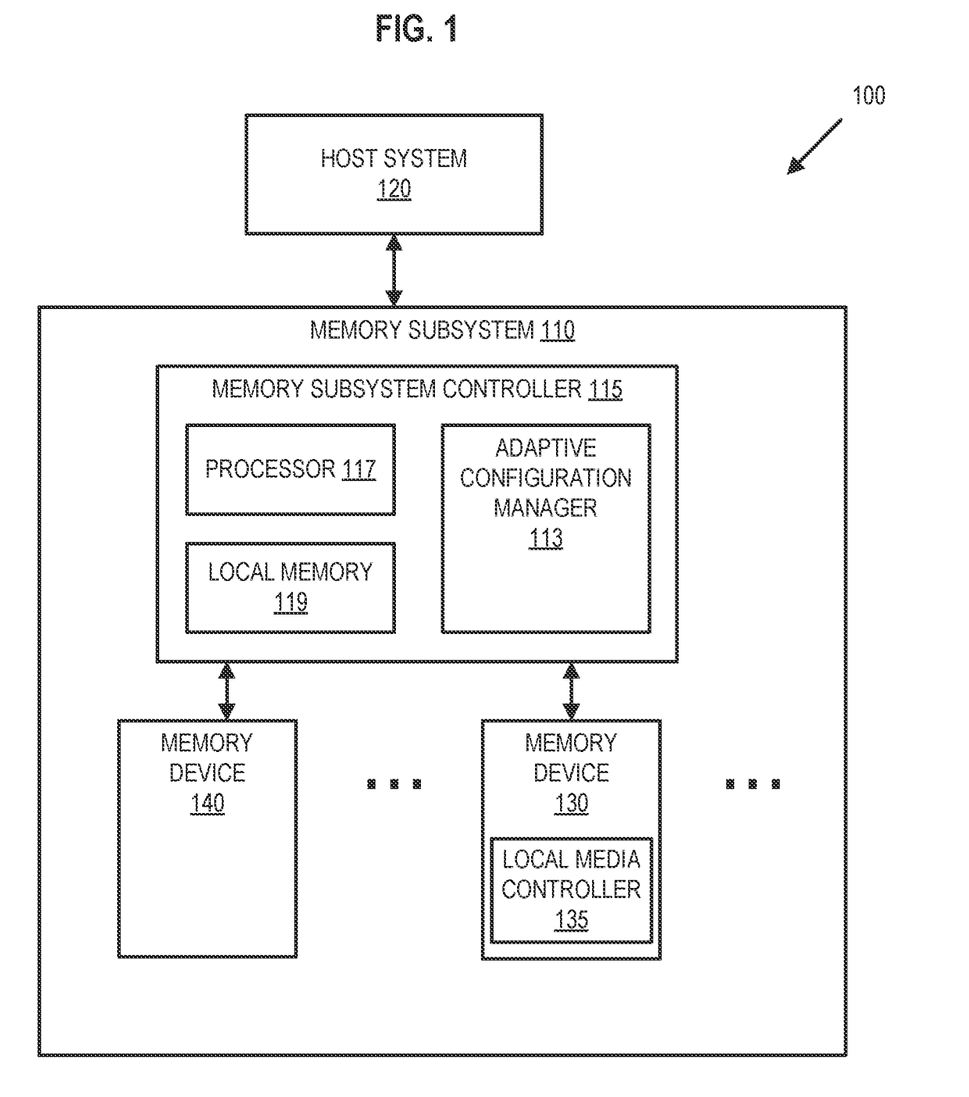
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an adaptive configuration manager 113 that can adjust parameters of a memory access command after identifying a host profile. In some embodiments, the controller 115 includes at least a portion of the adaptive configuration manager 113. For example, the controller 115 can include a processor 117 (processing device) configured to execute instructions stored in local memory 119 for performing the operations described herein. In some embodiments, an adaptive configuration manager 113 is part of the host system 120, an application, or an operating system.

The adaptive configuration manager 113 can configure the memory subsystem to access memory efficiently. The adaptive configuration manager 113 can store a library of pre-determined host profiles that represent various hosts that have different memory access parameters. For instance, the adaptive configuration manager 113 may create pre-determined host profiles that represent various distributions between sequential memory operations and random memory operations. During runtime, the adaptive configuration manager 113 receives memory access requests from one or more hosts. The adaptive configuration manager 113 analyzes the memory access requests and identifies a distribution of sequential memory access requests and random memory access requests. The distribution is represented by a ratio of sequential to random memory access requests. Using the ratio, the adaptive configuration manager 113 adjusts the configuration of the memory device to control the memory access and access a location of memory device where the data corresponding to the distribution and the host is stored. The adaptive configuration manager 113 can also update a profile assignment or otherwise create new profiles for a host that does not match a predetermined profile in the library of profiles. For a new profile, the adaptive configuration manager 113 specifies the type of memory access and the location that is accessed based on the monitored distribution of the host.

Further details with regards to the operations of the adaptive configuration manager 113 are described below.

Figure 2:
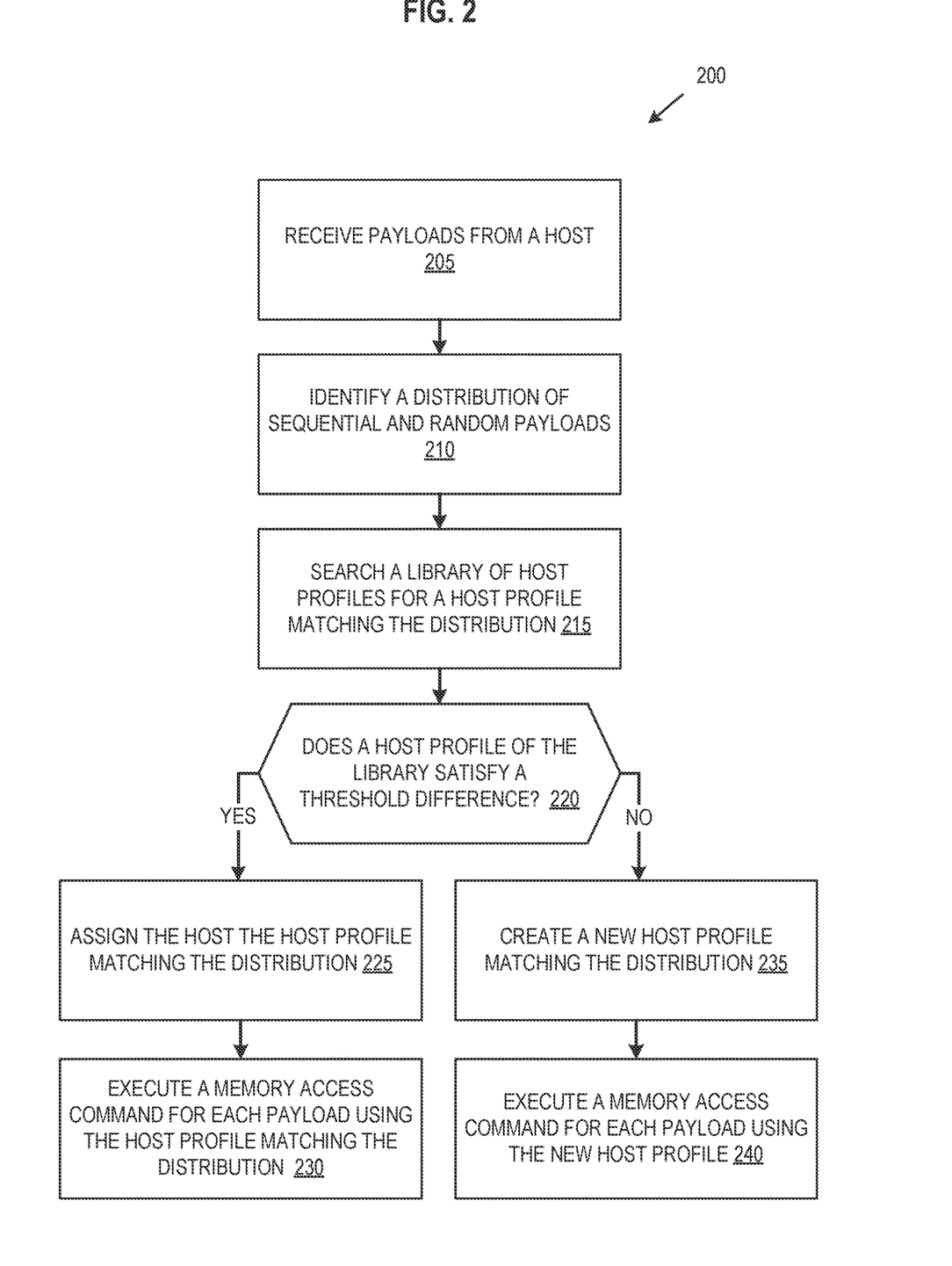
FIG. 2 is a flow diagram of an example method of adaptive configuration of memory devices in accordance with some embodiments of the present disclosure.
Figure 3:
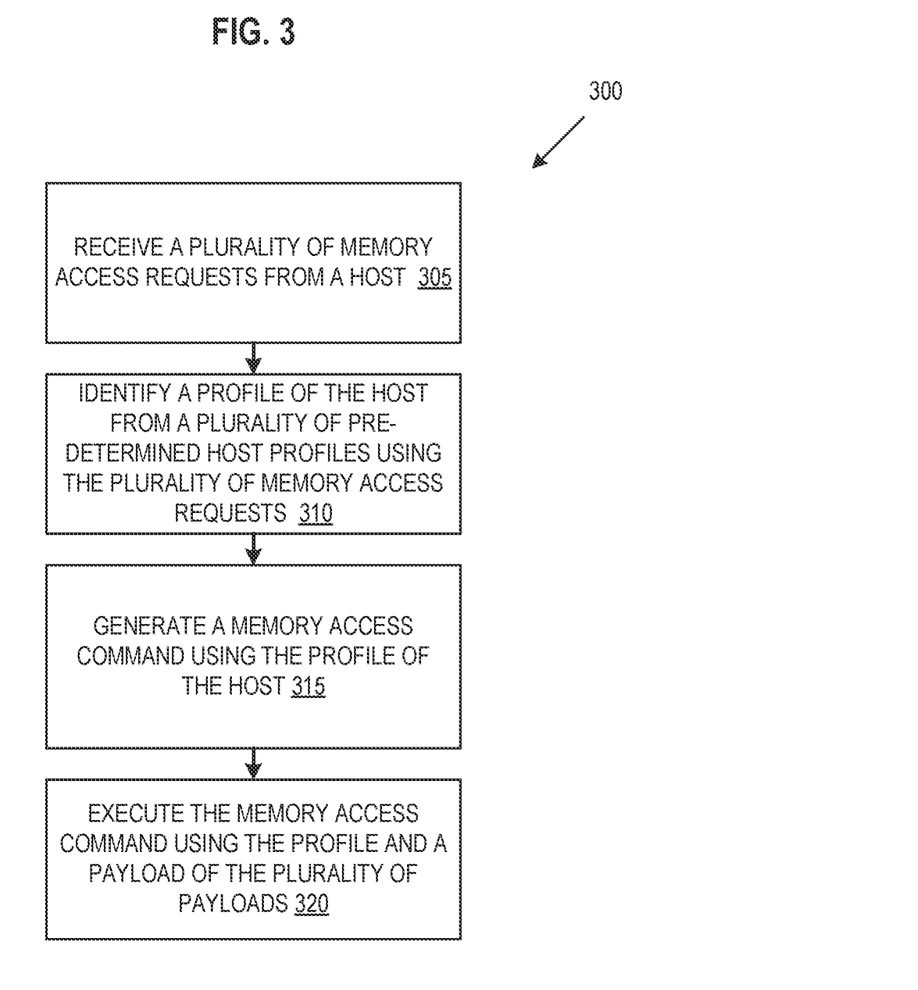
FIG. 3 is a flow diagram of an example method generating memory access commands using host profiles for memory devices in accordance with some embodiments of the present disclosure.

FIG. 2 is a flow diagram of an example method of adaptive configuration of memory devices in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the adaptive configuration manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. While FIGS. 2 and/or 3 describe the payload as a singular payload, the payload can be understood as multiple memory access requests from the same host.

At operation 205, the adaptive configuration manager 113 receives a payload from a host 120. For instance, the adaptive configuration manager 113 receives a request to perform a memory access command that includes the payload and metadata. Examples of payloads can include different types of data such as sequential data or random data for programming to the memory device 130. A sequential payload can be received for programming to a set of adjacent memory addresses while a random payload can be a set of memory addresses that are at separate locations across the memory device 130.

At operation 210, the adaptive configuration manager 113 identifies a distribution of sequential and random payloads. During runtime, the adaptive configuration manager 113 may analyze each payload from a host and determine a ratio of sequential to random memory access commands. For example, the adaptive configuration manager 113 receives a payload (or series of payloads) from a host that have a distribution of 40% random memory access and 60% sequential memory access. The adaptive configuration manager 113 represents this distribution as the ratio "0.4" for the host.

In another example, the adaptive configuration manager 113 receives another payload (or series of payloads) from a different host that have a distribution of 80% random memory access and 20% sequential memory access. The adaptive configuration manager 113 represents this distribution as the ratio "0.8" for the host in this example. The adaptive configuration manager 113 associates each of the distributions with the corresponding host.

At operation 215, the adaptive configuration manager 113 searches a library of host profiles for a host profile matching the distribution. In some embodiments, the library of host profiles includes multiple host profiles for varying distributions of random payloads and sequential payloads. Any number of host profiles can be included in the library with an example library including host profiles for every 10% of distribution change between the sequential and random memory access operations (e.g., 100%, 90/10%, 80/20%, etc.) respectively.

At operation 220, the adaptive configuration manager 113 determines if a host profile in the library of host profiles satisfies a threshold difference with regard to the distribution. For example, the adaptive configuration manager 113 determines a host profile satisfies the threshold difference by comparing the distribution associated with the host at operation 210 with each of the host profiles in the library of host profiles. In cases where a host profile satisfies the threshold difference, the method 200 proceeds to operation 225. In cases where a host profile does satisfy the threshold difference, the method 200 proceeds to operation 235.

In some embodiments, the adaptive configuration manager 113 does not identify a host profile in the library of host profiles that satisfies the threshold difference. The adaptive configuration manager 113 creates a new host profile and inserts it into the library of host profiles. To improve efficiency, a threshold difference (e.g., 5%) between a host profile and a distribution can be used to determine if an existing host profile is a match or if a new host profile is to be created in the library. For example, a library of host profiles may include a profile for each 20% change in distribution (80%/20%, 60%/40%) while a distribution identified for a host may be halfway between host profiles (70%/30%). Because the distribution identified for the host differs by 10% from the nearest host profile in the library of profiles and a threshold difference of 5%, the adaptive configuration manager 113 creates a new host profile for the 10% change in distribution and assigns performance parameters to the new host profile that represent the 70%/30% distribution of the host.

At operation 225, the adaptive configuration manager 113 assigns the host the pre-determined host profile from the library matching the distribution of the host. In some embodiments, the adaptive configuration manager 113 assigns a host profile that represents the distribution of the host. The adaptive configuration manager 113 configures the memory subsystem to perform memory access commands using the host profile. Examples of configurations include allocating particular sets of locations in memory such as a sequential set of blocks allocated to the host, or a set of locations across multiple blocks allocated to the host for random access. The adaptive configuration manager 113 may additionally configure performance parameters such as an allocation of physical or virtual functions using the host profile. The adaptive configuration manager 113 stores assigned host profiles for each host in a non-volatile memory location. In some embodiments, the adaptive configuration manager 113 determines a nearest host profile as a match. For instance, the adaptive configuration manager 113 identifies a particular host with a distribution of 58% random access and 42% sequential access. The adaptive configuration manager 113 can match this host with a nearest predetermined host profile that is 60% random access and 40% sequential access.

In some embodiments, the adaptive configuration manager 113 receives a priority during configuration of the memory device for each host. The adaptive configuration manager 113 can assign a profile to the host after negotiating a performance commitment using the priority. For example, the adaptive configuration manager 113 can apply a stricter threshold for matching profiles for hosts that have a greater priority and a less strict threshold for hosts that have a lesser priority. In another example, the adaptive configuration manager 113 can select a different profile for a host with a lesser priority to comply with performance commitments to the host with greater priority.

At operation 230, the adaptive configuration manager 113 executes a memory access command for the payload using the host profile matching the distribution. In some embodiments, the adaptive configuration manager 113 can perform the memory access command such as a read or write to a location of the memory device that is associated with the distribution of the host profile. For example, the adaptive configuration manager can program the payload to one or more locations of the memory device that is allocated to a host and is associated with a random or sequential memory access command.

At operation 235, the adaptive configuration manager 113 creates a new host profile and inserts it into the library of host profiles. For example, the adaptive configuration manager 113 creates an identifier for a host profile, a set of parameters based on the distribution, and stores the new host profile in the non-volatile memory location.

At operation 240, the adaptive configuration manager 113 executes a memory access command for the payload using the new host profile. For example, the operations are substantially the same as at operation 230 but using the new profile created at operation 235 to execute the memory access command.

In some embodiments, the method 200 is performed after an initial time interval such as during a setup procedure between the hosts and the adaptive configuration manager of the memory subsystem. In other embodiments, the method 200 is performed iteratively to identify changes in a distribution of a host that can be more closely represented by a different host profile of the library of host profiles. The method 200 can be performed iteratively after predetermined time intervals or the adaptive configuration manager 113 can monitor additional payloads and trigger an iteration by determining that an additional distribution of the additional payloads (e.g., the ratio of sequential to random) from a host is a different ratio than the ratio of the assigned host profile. The adaptive configuration manager 113 updates the host profile assignment to the different host profile that more closely represents the distribution of the host after performing each additional iteration.

FIG. 3 is a flow diagram of an example method 300 generating memory access commands using host profiles for memory devices in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the adaptive configuration manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the adaptive configuration manager 113 receives a plurality of memory access requests from a host. As described above with regard to operation 205, the adaptive configuration manager 113 receives a series of memory access requests from multiple hosts with each memory access request including a payload that includes metadata indicating that the memory access request is sequential or random.

At operation 310, the adaptive configuration manager 113 identifies a profile of the host from a plurality of predetermined host profiles using the plurality of memory access requests. As described above with regard to operations 210 and 215, the adaptive configuration manager 113 identifies the type of memory access request as a random or sequential.

At operation 315, the adaptive configuration manager 113 generates a memory access command using the profile of the host. In some embodiments, the adaptive configuration manager 113 generates a location or set of locations for programming each payload from the host. For example, the memory access command includes a register or column address, a voltage threshold for reading or writing data, and other parameters.

At operation 320, the adaptive configuration manager 113 executes the memory access command using the profile and a payload of the plurality of payloads. As described above with regard to operation 225, the adaptive configuration manager 113 performs a programming or read of the memory device using the memory access command.

Figure 4:
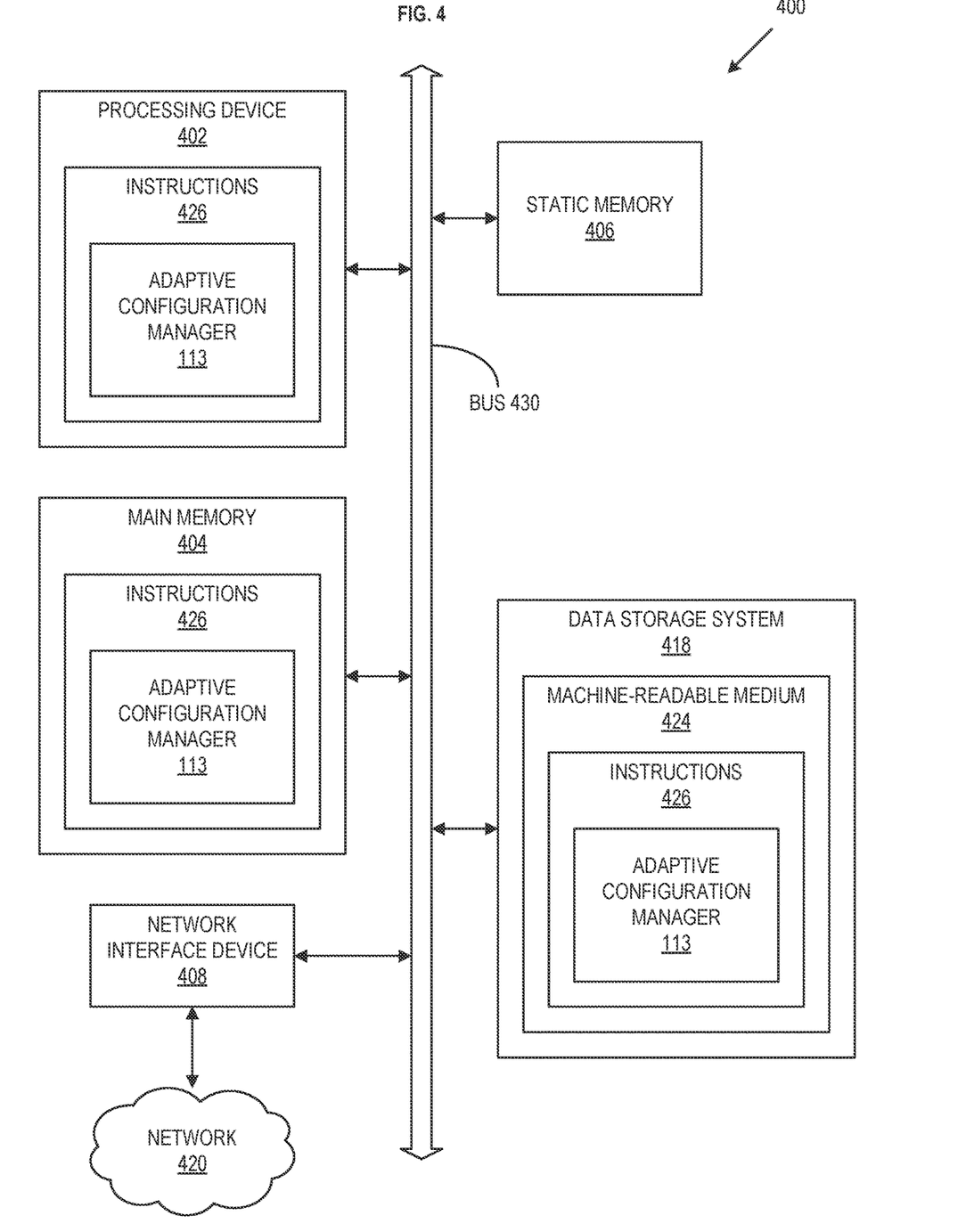
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the adaptive configuration manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to an adaptive configuration manager 113 (e.g., the adaptive configuration manager 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving a plurality of memory access requests from a host;
    identifying a profile of the host from a plurality of pre-determined host profiles using the plurality of memory access requests, wherein identifying the profile comprises identifying a distribution of the plurality of memory access requests, wherein the distribution includes a set of sequential payloads and a set of random payloads;
    updating the identified profile of the host based on a pre-determined host profile of the plurality of pre-determined host profiles, wherein the identified profile is updated with the distribution;
    generating a memory access command using the profile of the host, wherein the memory access command includes a payload of programming and a set of locations in memory; and
    executing the memory access command using the profile and the payload.

2. The method of claim 1, wherein identifying a profile of the host from a plurality of pre-determined host profiles using the plurality of memory access requests comprises comparing the distribution to each pre-determined host profile of the plurality of pre-determined host profiles.

3. The method of claim 2, wherein the distribution of the host is represented by a ratio of the set of sequential payloads to the set of random payloads.

4. The method of claim 2, wherein the plurality of pre-determined host profiles include a plurality of profiles having different ratios of sequential and random memory access operations.

5. The method of claim 2 further comprising assigning the host with the identified profile for additional processing of memory access requests from the host.

6. The method of claim 5, wherein updating the identified profile of the host based on the pre-determined host profile of the plurality of pre-determined host profiles, and wherein the identified profile is updated with the distribution; further comprises:
    monitoring the plurality of memory access requests from the host; and
    determining that an additional distribution of an additional plurality of memory access requests is different than the identified profile for the host.

7. The method of claim 6, further comprising:
    comparing the additional distribution to each pre-determined host profile of the plurality of pre-determined host profiles; and
    updating the identified profile of the host based on a nearest pre-determined host profile to the additional distribution.

8. A system comprising:
    a plurality of memory devices; and
    a processing device, operatively coupled with the plurality of memory devices, to:
    receive a plurality of payloads from a host;
    identify a distribution of sequential payloads and random payloads in the plurality of payloads;
    identify a profile of the host from a plurality of pre-determined host profiles using the plurality of payloads from the host;
    update the identified profile of the host based on a pre-determined host profile of the plurality of pre-determined host profiles, wherein the identified profile is updated with the distribution;
    execute a memory access command using the updated host profile and a payload of the plurality of payloads.

9. The system of claim 8, wherein the pre-determined host profiles include a plurality of profiles having different ratios of sequential and random memory access operations.

10. The system of claim 8, wherein the profile of the host is determined by a ratio of the sequential payloads to the random payloads.

11. The system of claim 8, the processing device, operatively coupled with the plurality of memory devices, further to:
    monitor the plurality of payloads from the host; and
    determine that an additional distribution of an additional plurality of payloads is different than the identified pre-determined profile for the host.

12. The system of claim 11, the processing device, operatively coupled with the plurality of memory devices, further to:
  compare the additional distribution to each pre-determined host profile of a library of host profiles; and
  update the identified profile of the host based on a nearest pre-determined host profile to the additional distribution.

13. The system of claim 8, the processing device, operatively coupled with the plurality of memory devices, further to:
  receive a second plurality of payloads from the host;
  identify a second distribution of sequential payloads and random payloads in the second plurality of payloads;
  search a library of host profiles for a pre-determined host profile matches the second distribution;
  assign the pre-determined host profile that matches the distribution to the host; and
  execute a second memory access command using the pre-determined host profile and a payload of the second plurality of payloads.

14. A non-transitory computer-readable storage medium comprising instructions that, when executed by a processing device, cause the processing device to:
  receive a plurality of payloads from a host;
  identify a distribution of the plurality of payloads, wherein the distribution includes a set of sequential payloads and a set of random payloads;
  identify a profile of the host from a plurality of pre-determined host profiles using the distribution of the plurality of payloads;
  update the identified profile of the host based on a pre-determined host profile of the plurality of pre-determined host profiles, wherein the identified profile is updated with the distribution;
  generate a memory access command using the profile of the host, wherein the memory access command includes a distribution of random and sequential access; and
  execute the memory access command using the profile and a payload of the plurality of payloads.

15. The non-transitory computer-readable storage medium of claim 14, the instructions further causing the processing device to compare the distribution to each pre-determined host profile of the plurality of pre-determined host profiles.

16. The non-transitory computer-readable storage medium of claim 15, wherein the profile of the host is determined by a ratio of the set of sequential payloads and the set of random payloads.

17. The non-transitory computer-readable storage medium of claim 15, wherein the plurality of pre-determined host profiles include a plurality of profiles having different ratios of sequential and random memory access operations.

18. The non-transitory computer-readable storage medium of claim 15, the instructions further causing the processing device to assign the host the identified profile for additional payloads processing.

19. The non-transitory computer-readable storage medium of claim 18, wherein updating the identified profile of the host based on the pre-determined host profile of the plurality of pre-determined host profiles, and wherein the identified profile is updated with the distribution further comprises instructions that, when executed by the processing device, cause the processing device to:
  monitor the plurality of payloads from the host; and
  determine that an additional distribution of an additional plurality of payloads is different than the identified profile for the host.

20. The non-transitory computer-readable storage medium of claim 19, further comprising instructions that, when executed by the processing device, cause the processing device to:
  compare the additional distribution to each pre-determined host profile of the plurality of pre-determined host profiles; and
  update the identified profile of the host based on a nearest pre-determined host profile to the additional distribution.

* * * * *